(12) United States Patent
Lynch et al.

(10) Patent No.: US 12,637,168 B2
(45) Date of Patent: May 26, 2026

(54) BICYCLE SUSPENSION COMPONENTS

(71) Applicant: SRAM, LLC, Chicago, IL (US)

(72) Inventors: Tim Lynch, Colorado Springs, CO (US); Skyler Teachout, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 18/545,039

(22) Filed: Dec. 19, 2023

(65) Prior Publication Data

US 2024/0116595 A1 Apr. 11, 2024

Related U.S. Application Data

(63) Continuation of application No. 16/904,540, filed on Jun. 17, 2020, now Pat. No. 12,024,257.

(51) Int. Cl.
| | |
|---|---|
| *B62K 25/08* | (2006.01) |
| *B62K 25/02* | (2006.01) |
| *B62K 25/04* | (2006.01) |
| *F16F 13/06* | (2006.01) |
| *F16F 13/08* | (2006.01) |

(52) U.S. Cl.
CPC .............. *B62K 25/08* (2013.01); *B62K 25/02* (2013.01); *B62K 2025/048* (2013.01); *B62K 2201/04* (2013.01); *F16F 13/06* (2013.01); *F16F 13/08* (2013.01)

(58) Field of Classification Search
CPC ........ B60G 11/27; B60G 15/06; B60G 15/08; B62K 25/02; B62K 25/08; B62K 2025/048; B62K 2201/04; F16F 9/34; F16F 13/06; F16F 13/08

USPC ...................................... 188/321.11; 280/276
See application file for complete search history.

(56) References Cited

U.S. PATENT DOCUMENTS

| | | | |
|---|---|---|---|
| 1,200,446 | A | 10/1916 | Funk |
| 2,212,759 | A | 8/1940 | Tea |
| 4,433,759 | A | 2/1984 | Ichinose |
| 4,791,712 | A | 12/1988 | Wells |

(Continued)

FOREIGN PATENT DOCUMENTS

| | | |
|---|---|---|
| BE | 425983 A | 2/1938 |
| CH | 289869 A | 3/1953 |

(Continued)

OTHER PUBLICATIONS

2021 King Off-Road Racing Shocks Product Catalog, 2021 [online], King Shock Technology, Inc., 2021 [Retrieved on Aug. 18, 2022] Retrieved from the Internet: <http://www.kingshocks.com/products/ downloads/ catalog/>.

(Continued)

*Primary Examiner* — Christopher P Schwartz

(57) ABSTRACT

Example bicycle suspension components are described herein. An example suspension component includes a first tube and a second tube configured in a telescopic arrangement and defining an interior space, and a damper in the interior space. The damper includes a damper body defining a chamber, a damper member in the chamber, and a shaft coupled to the damper member. The example suspension component also includes an isolator coupling the shaft to a bottom end of the second tube, the isolator including an elastomeric member to absorb vibrations.

13 Claims, 9 Drawing Sheets

(56) References Cited

U.S. PATENT DOCUMENTS

| | | | | |
|---|---|---|---|---|
| 5,367,918 | A * | 11/1994 | Chang | B62K 25/08 |
| | | | | 280/279 |
| 5,580,075 | A * | 12/1996 | Turner | F16F 9/50 |
| | | | | 267/141.1 |
| 5,628,388 | A | 5/1997 | Angermann | |
| 5,649,693 | A | 7/1997 | Busby et al. | |
| 6,217,049 | B1 | 4/2001 | Becker | |
| 6,343,807 | B1 | 2/2002 | Rathbun | |
| 6,505,719 | B2 | 1/2003 | Gonzalez et al. | |
| 6,651,787 | B2 | 11/2003 | Grundei | |
| 7,201,260 | B2 | 4/2007 | Diederich et al. | |
| 8,668,213 | B2 * | 3/2014 | Takagi | B60G 13/003 |
| | | | | 280/124.147 |
| 9,132,709 | B2 * | 9/2015 | Endo | B60G 15/067 |
| 9,132,881 | B2 | 9/2015 | Kwaterski | |
| 9,302,561 | B2 * | 4/2016 | Itou | F16F 9/58 |
| 9,452,651 | B2 * | 9/2016 | Toyota | B60G 13/003 |
| 9,481,425 | B2 * | 11/2016 | Shirai | B62K 25/08 |
| 9,630,679 | B2 | 4/2017 | Aoki | |
| 9,988,124 | B2 | 6/2018 | Kwaterski | |
| 10,099,743 | B2 | 10/2018 | Walthert et al. | |
| 10,166,832 | B2 * | 1/2019 | DeBruler | B60G 17/0155 |
| 10,703,158 | B2 | 7/2020 | Pielock et al. | |
| 10,731,724 | B2 | 8/2020 | Laird | |
| 10,933,940 | B2 * | 3/2021 | Walthert | B62K 25/08 |
| 11,884,359 | B2 * | 1/2024 | Lynch | F16F 9/54 |
| 2002/0175035 | A1 * | 11/2002 | Achenbach | F16F 9/084 |
| | | | | 188/315 |
| 2002/0195755 | A1 | 12/2002 | Hoose | |
| 2003/0051957 | A1 | 3/2003 | Lemieux | |
| 2005/0133322 | A1 * | 6/2005 | Huprikar | B60G 13/003 |
| | | | | 188/321.11 |
| 2007/0119671 | A1 * | 5/2007 | Quinn | F16F 9/58 |
| | | | | 188/281 |
| 2008/0041681 | A1 | 2/2008 | Shipman | |
| 2009/0302558 | A1 | 12/2009 | Shirai | |
| 2010/0117322 | A1 | 5/2010 | Achenbach | |
| 2012/0068436 | A1 | 3/2012 | Powell | |
| 2012/0187651 | A1 | 7/2012 | Wimmer | |
| 2013/0313803 | A1 | 11/2013 | Kwaterski | |
| 2015/0054253 | A1 | 2/2015 | Pye | |
| 2015/0091271 | A1 | 4/2015 | Ikeda | |
| 2015/0344101 | A1 | 12/2015 | Kwaterski | |
| 2016/0040741 | A1 | 2/2016 | Laird et al. | |
| 2017/0106938 | A1 | 4/2017 | Pelot | |
| 2017/0167563 | A1 | 6/2017 | Galasso et al. | |
| 2017/0334504 | A1 | 11/2017 | Pye et al. | |
| 2018/0313423 | A1 | 11/2018 | Laird | |
| 2018/0334219 | A1 | 11/2018 | Walthert et al. | |
| 2019/0054973 | A1 | 2/2019 | Barefoot | |
| 2019/0145483 | A1 | 5/2019 | Laird et al. | |
| 2020/0094910 | A1 | 3/2020 | Weagle | |
| 2020/0256420 | A1 * | 8/2020 | Mallin | F16F 9/49 |
| 2021/0010556 | A1 | 1/2021 | Laird | |
| 2022/0252126 | A1 | 8/2022 | Matsumoto | |
| 2022/0364626 | A1 | 11/2022 | Leclercq | |
| 2023/0055754 | A1 | 2/2023 | Kim | |

FOREIGN PATENT DOCUMENTS

| | | |
|---|---|---|
| CN | 1784337 A | 6/2006 |
| CN | 104648585 A | 5/2015 |
| CN | 109572905 A | 4/2019 |
| CN | 209705168 U | 11/2019 |
| CN | 111043221 A | 4/2020 |
| DE | 1264165 B | 3/1968 |
| DE | 1292018 B | 4/1969 |
| DE | 1937147 A1 | 2/1971 |
| DE | 1780447 B1 | 3/1972 |
| DE | 2504202 A1 | 8/1975 |
| DE | 3301707 A1 | 7/1984 |
| DE | 3600845 A1 | 8/1986 |
| DE | 4032398 A1 | 4/1991 |
| DE | 4212079 A1 | 10/1993 |
| DE | 29920363 U1 | 2/2000 |
| DE | 20100117 U1 | 4/2001 |
| DE | 20219730 U1 | 3/2003 |
| DE | 10229287 A1 | 1/2004 |
| DE | 202004013640 U1 | 11/2004 |
| DE | 102012012902 A1 | 1/2013 |
| DE | 102013109342 A1 | 3/2015 |
| DE | 102015115678 A1 | 3/2017 |
| DE | 102015219168 A1 | 4/2017 |
| DE | 102017207523 B3 | 9/2018 |
| DE | 102018216814 | 3/2019 |
| EP | 3403910 A1 | 11/2018 |
| GB | 191029850 A | 10/1911 |
| GB | 104022 A | 2/1917 |
| GB | 116153 A | 6/1918 |
| GB | 155973 A | 1/1921 |
| GB | 408592 A | 4/1934 |
| GB | 693660 A | 7/1953 |
| GB | 752284 A | 7/1956 |
| GB | 899650 B | 6/1962 |
| JP | 526263 A | 1/1977 |
| JP | 5315967 A | 2/1978 |
| JP | 5753139 U | 3/1982 |
| JP | 604478 A | 1/1985 |
| JP | 6322781 A | 1/1988 |
| JP | 0335334 U | 4/1991 |
| JP | 069995 B2 | 2/1994 |
| JP | 069996 B2 | 2/1994 |
| JP | 0649507 Y2 | 12/1994 |
| JP | 0791475 A | 4/1995 |
| JP | 0774024 B2 | 8/1995 |
| JP | 08300928 A | 11/1996 |
| JP | 09119466 A | 5/1997 |
| JP | 2000009168 A | 1/2000 |
| JP | 2001241506 A | 9/2001 |
| JP | 2002130354 A | 5/2002 |
| JP | 2003014025 A | 1/2003 |
| JP | 2005180615 A | 7/2005 |
| JP | 2006090381 A | 4/2006 |
| JP | 2008045604 A | 2/2008 |
| JP | 2009108916 A | 5/2009 |
| JP | 2009264500 A | 11/2009 |
| JP | 2011163550 A | 8/2011 |
| JP | 2012092945 A | 5/2012 |
| JP | 2017180683 A | 10/2017 |
| TW | 200942443 | 10/2009 |
| TW | 201004834 | 2/2010 |
| TW | 201228873 | 7/2012 |
| TW | 201241336 A | 10/2012 |
| TW | 201520120 | 6/2015 |
| TW | I657956 B | 5/2019 |
| TW | 202015959 | 5/2020 |
| WO | 2006095032 A1 | 9/2006 |
| WO | 2012075236 A1 | 6/2012 |
| WO | 2014009019 A1 | 1/2014 |
| WO | 2015028510 A1 | 3/2015 |

OTHER PUBLICATIONS

Coilover Spring Rates for Toyota Tacoma & 4Runner, [online], Accutune, Mar. 28, 2019 [Retrieved on Sep. 12, 2022] Retrieved from the Internet: <https://accutuneoffroad.com/shock_selection/>.

Steinke, Aaron, First Look: A new revolutionary suspension system by Corratec?, Enduro Mountainbike Magazine (online), Mar. 5, 2014, https://enduro-mtb.com/en/first-look-a-new-revolutionary-suspension-system-by-corratec/, Last Checked Apr. 24, 2023.

OREDY Shocks Struts 2PCS Front Struts Coil Spring Suspension Struts Assembly, Web Page, https://www.metalpartmaker.com/index.php?route=product/product&product_id=24036, Last Checked Feb. 23, 2022.

* cited by examiner

BICYCLE SUSPENSION COMPONENTS

This application claims the benefit of U.S. patent application Ser. No. 16/904,540, filed Jun. 17, 2020, which is hereby incorporated by reference in its entirety.

FIELD OF THE DISCLOSURE

This disclosure relates generally to bicycle components and, more specifically, to bicycle suspension components.

BACKGROUND

Bicycles are known to have suspension components. Suspension components are used for various applications, such as cushioning impacts, vibrations, or other disturbances experienced by the bicycle during use. A common application for suspension components on bicycles is for cushioning impacts or vibrations experienced by the rider when the bicycle is ridden over bumps, nits, rocks, pot holes, and/or other obstacles. These suspension components include rear and/or front wheel suspension components. Suspension components may also be used in other locations, such as a seat post or handlebar, to insulate the rider from impacts.

SUMMARY

An example suspension component for a bicycle disclosed herein includes a first tube and a second tube configured in a telescopic arrangement and defining an interior space and a damper in the interior space. The damper includes a damper body defining a chamber, a damper member in the chamber, and a shaft coupled to the damper member. The suspension component also includes an isolator coupling the shaft to a bottom end of the second tube. The isolator includes an elastomeric member to absorb vibrations An example suspension component for a bicycle disclosed herein includes a first upper tube and a first lower tube configured in a telescopic arrangement and a second upper tube and a second lower tube configured in a telescopic arrangement. The first upper tube is coupled to the second upper tube. The suspension component includes a damper in an interior space defined by the first upper and lower tubes. The damper has a first shaft coupled to a damper member. The suspension component also includes a spring in an interior space defined by the second upper and lower tubes. The spring has a second shaft coupled to a piston. The suspension component further includes a first isolator in the first lower tube. The first isolator couples the first shaft to a bottom end of the first lower tube. The suspension component also includes a second isolator in the second lower tube. The second isolator couples the second shaft to a bottom end of the second lower tube.

An example suspension component for a bicycle disclosed herein includes a first tube and a second tube configured in a telescopic arrangement, a damper shaft, and an isolator including a housing coupled to an end of the second tube, first and second cushioning members disposed in the housing, and a translating coupler coupled to the damper shaft. The translating coupler has a plate disposed in the housing between the first and second cushioning members. The first and second cushioning members to enable relative movement between the first and second tubes.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
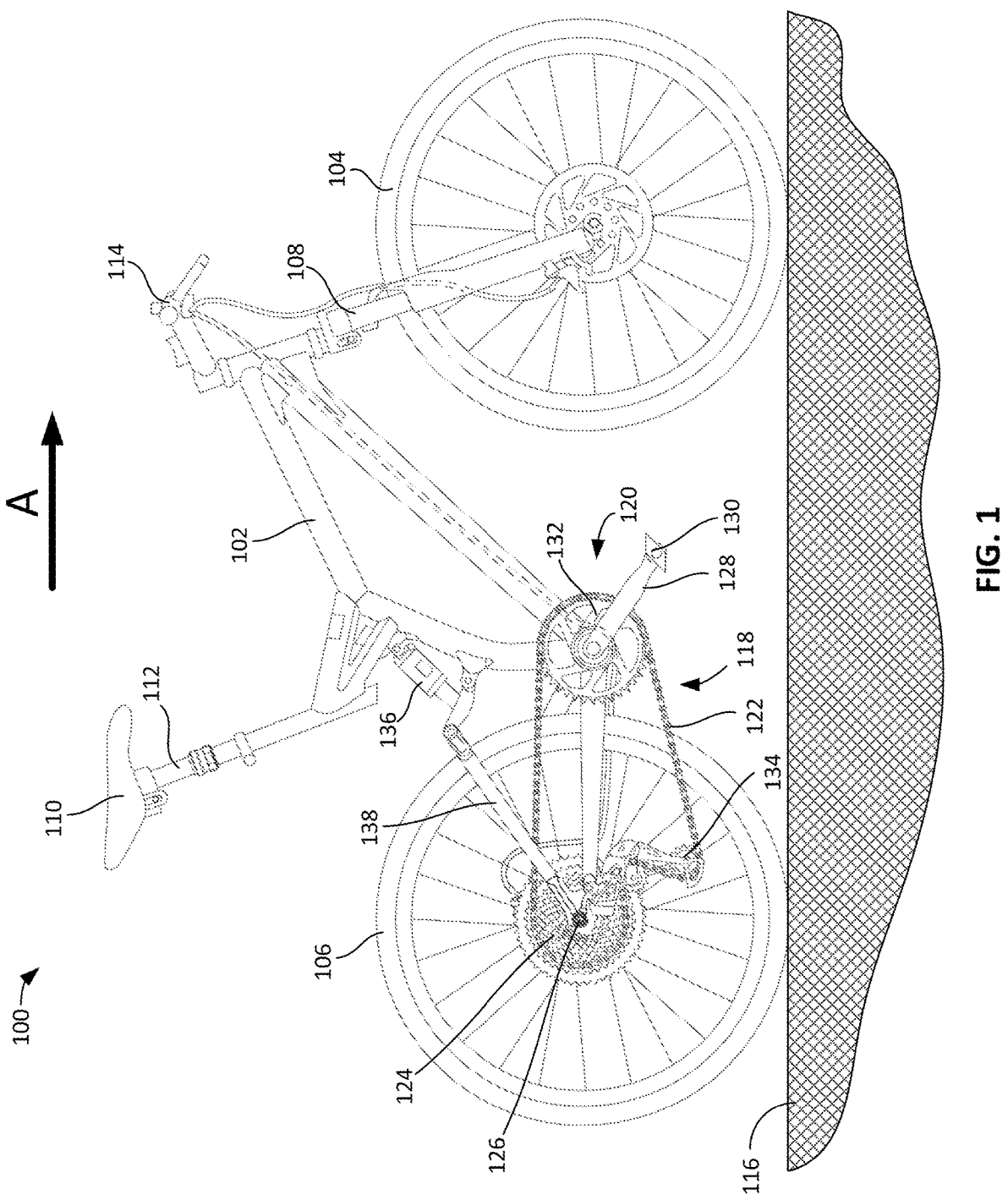
FIG. 1 is a side view of an example bicycle that may employ example suspension components disclosed herein.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example suspension components that can be implemented on a vehicle, such as a bicycle. An example suspension component disclosed herein is a front fork that connects the frame to the front wheel. The front fork may have first and second legs formed by first and second upper leg portions (tubes) that are telescopically arranged with respective first and second lower leg portions. The first and second upper leg portions are coupled to the frame and the first and second lower leg portions are coupled to the wheel. The front fork may have a damper and a spring that act in conjunction to absorb shock impulses. The damper can be arranged in the first upper and lower leg portions of the first leg, and the spring can be arranged in the second upper and lower leg portions of the second leg.

In known front forks, the damper and the spring require a certain breakaway force before the upper and lower leg portions begin to move relative to each other. In particular, the damper and spring may include pistons with seals that require a certain amount of force to overcome the static friction before the leg portions can move relative to each other. Further, every time the direction of movement changes (e.g., expansion to compression), this static friction needs to be overcome. As such, there is a slight delay while the force builds up before the upper and lower leg portions begin to move. This results in a stick slip feel that can be felt by the rider at the handlebars. Further, high frequency (e.g., frequencies above 5 hertz (Hz)), lower amplitude vibrations, such as those caused by a washboard terrain, are typically not absorbed by the damper and spring. Instead, these high frequency vibrations are transmitted through the front fork to the frame and, thus, can be felt by the rider. Some riders attempt to remedy this effect by reducing the pressure in their tires. However, this can be unsafe, because the tires may sway from the rims and cause the rider to lose control. Further, reducing the tire pressure increases the likelihood of getting a pinch flat (where the edges of the rim puncture the tire).

Disclosed herein are example isolators that can be implemented in a suspension component, such as a front fork. The isolators are configured to improve shock absorption and absorb high frequency vibrations. The example isolators include one or more cushioning members that enable relative movement of the upper and lower leg portions without having to overcome the friction in the seals of the damper and spring components. In some examples, the cushioning members are implemented as elastomeric members (e.g., rubber pads). In other examples, the cushioning member can be implemented as springs (e.g., metallic coil springs) or other types of cushioning members. Therefore, when riding over a bump, for example, the first and second lower leg portions can move upward relative to the first and second upper leg portions before the breakaway force is reached. As such, the isolators enable the front fork to more quickly absorb shocks and impulses. These lower frequency vibrations are transmitted through the isolator to the damper and/or spring components. Further, the example isolators also absorb high frequency vibrations, such as frequencies above 5 Hz, that would otherwise be transmitted to the handlebars and felt by the rider. The example isolators enable the lower leg portions (which are attached to the wheel) to flutter or vibrate independent of the upper leg portions, thereby reducing vibrations that are felt by the rider. Therefore, lower frequency vibrations are partially absorbed by the isolators until the breakaway force causes the damper and spring to compress or expand, while high frequency vibrations are absorbed by the isolators. As such, the example isolators disclosed herein reduce vibrations felt at the handlebars by the rider, which creates a more comfortable ride for the rider. Further, this increases rider confidence in the traction and grip at the wheels.

In some examples disclosed herein, the front fork includes an isolator that is used in connection with the damper in the first upper and lower leg portions of the first leg. For example, an isolator can be disposed in the first lower leg portion. The isolator couples a damper shaft to a bottom end of the first lower leg portion (the unsprung mass), which is attached to the wheel. The isolator includes a housing that is rigidly coupled to the bottom end of the first lower leg portion. The isolator includes a translating coupler, such as a translating bolt, that is partially disposed in the housing and extends outward from the housing and is rigidly coupled to a bottom end of the damper shaft. The translating coupler is movable with the shaft relative to the housing. The translating coupler has a plate (e.g., a flange) in the housing. In some examples, the isolator has first and second cushioning members, such as first and second elastomeric members (e.g., rubber rings), disposed in the housing on opposite sides of the plate. The first and second elastomeric members bias the plate (and, thus the translating coupler) in opposite directions. Therefore, the example isolator separates the damper shaft from the bottom end of the lower leg portion, which enables the upper and lower leg portions to move relative to each other before overcoming the friction in the damper seals. When a compressive force is applied to the front fork, for example, one of the elastomeric members is compressed, which enables the first lower leg portion to move upward relative to the upper leg portion. Because the elastomeric members are disposed on opposite sides of the plate, the initiating force to move the lower leg relative to the upper leg is zero. Lower frequency vibrations are transmitted through the isolator to the damper until the breakaway force is reached and damper and spring compress. When the compressive force is removed, the elastomeric member biases the lower leg portion back to the original position relative to the upper leg portion. The opposite reaction occurs during rebound. Therefore, the isolator acts as a spring in series with the damper, thereby enabling relative movement between the upper and lower leg portions. The elastomeric members also absorb high frequency vibrations that would otherwise not be absorbed by the damper and spring.

In some examples, an isolator can also be used in connection with the spring in the second upper and lower leg portions of the second leg. For example, a second isolator can be coupled between a spring shaft and a bottom end of the second lower leg portion. The second isolator functions in a similar manner to enable relative movement between the second lower leg portion and the spring shaft (and, thus, the second upper leg portion). Therefore, in some examples, the front fork may include two isolators. However, in other examples, only one isolator may be implemented (e.g., only on the damper side, only on the spring side).

Turning now to the figures, FIG. 1 illustrates one example of a human powered vehicle on which the example suspension components disclosed herein may be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. A front and/or forward riding direction or orientation of the bicycle 100 is indicated by the direction of the arrow A in FIG. 1. As such, a forward direction of movement for the bicycle 100 is indicated by the direction of arrow A.

In the illustrated example of FIG. 1, the bicycle 100 includes a seat 110 coupled to the frame 102 (e.g., near the rear end of the frame 102 relative to the forward direction A) via a seat post 112. The bicycle 100 also includes handlebars 114 coupled to the frame 102 and the front fork 108 (e.g., near a forward end of the frame 102 relative to the forward direction A) for steering the bicycle 100. The bicycle 100 is shown on a riding surface 116. The riding surface 116 may be any riding surface such as the ground (e.g., a dirt path, a sidewalk, a street, etc.), a man-made structure above the ground (e.g., a wooden ramp), and/or any other surface.

In the illustrated example, the bicycle 100 has a drivetrain 118 that includes a crank assembly 120. The crank assembly 120 is operatively coupled via a chain 122 to a sprocket assembly 124 mounted to a hub 126 of the rear wheel 106. The crank assembly 120 includes at least one, and typically two, crank arms 128 and pedals 130, along with at least one front sprocket, or chainring 132. A rear gear change device 134, such as a derailleur, is disposed at the rear wheel 106 to move the chain 122 through different sprockets of the sprocket assembly 124. Additionally or alternatively, the bicycle 100 may include a front gear change device to move the chain 122 through gears on the chainring 132.

The example bicycle 100 includes a suspension system having one or more suspension components. In this example, the front fork 108 is implemented as a front suspension component. The front fork 108 is or integrates a shock absorber that includes a spring and a damper, disclosed in further detail herein. Further, in the illustrated example, the bicycle 100 includes a rear suspension component 136, which is a shock absorber, referred to herein as the rear shock absorber 136. The rear shock absorber 136 is coupled between two portions of the frame 102, including a swing arm 138 coupled to the rear wheel 106. The front fork 108 and the rear shock absorber 136 absorb shocks and vibrations while riding the bicycle 100 (e.g., when riding over rough terrain). In other examples, the front fork 108 and/or the rear shock absorber 136 may be integrated into the bicycle 100 in other configurations or arrangements. Further, in other examples, the suspension system may employ only one suspension component (e.g., only the front fork 108) or more than two suspension components (e.g., an additional suspension component on the seat post 112) in addition to or as an alternative to the front fork 108 and rear shock absorber 136.

While the example bicycle 100 depicted in FIG. 1 is a type of mountain bicycle, the example suspension components and isolators disclosed herein can be implemented on other types of bicycles. For example, the disclosed suspension components and isolators may be used on road bicycles, as well as bicycles with mechanical (e.g., cable, hydraulic, pneumatic, etc.) and non-mechanical (e.g., wired, wireless) drive systems. The disclosed suspension components and isolators may also be implemented on other types of two-wheeled, three-wheeled, and four-wheeled human powered vehicles. Further, the example suspension components and isolators can be used on other types of vehicles, such as motorized vehicles (e.g., a motorcycle, a car, a truck, etc.).

Figure 2:
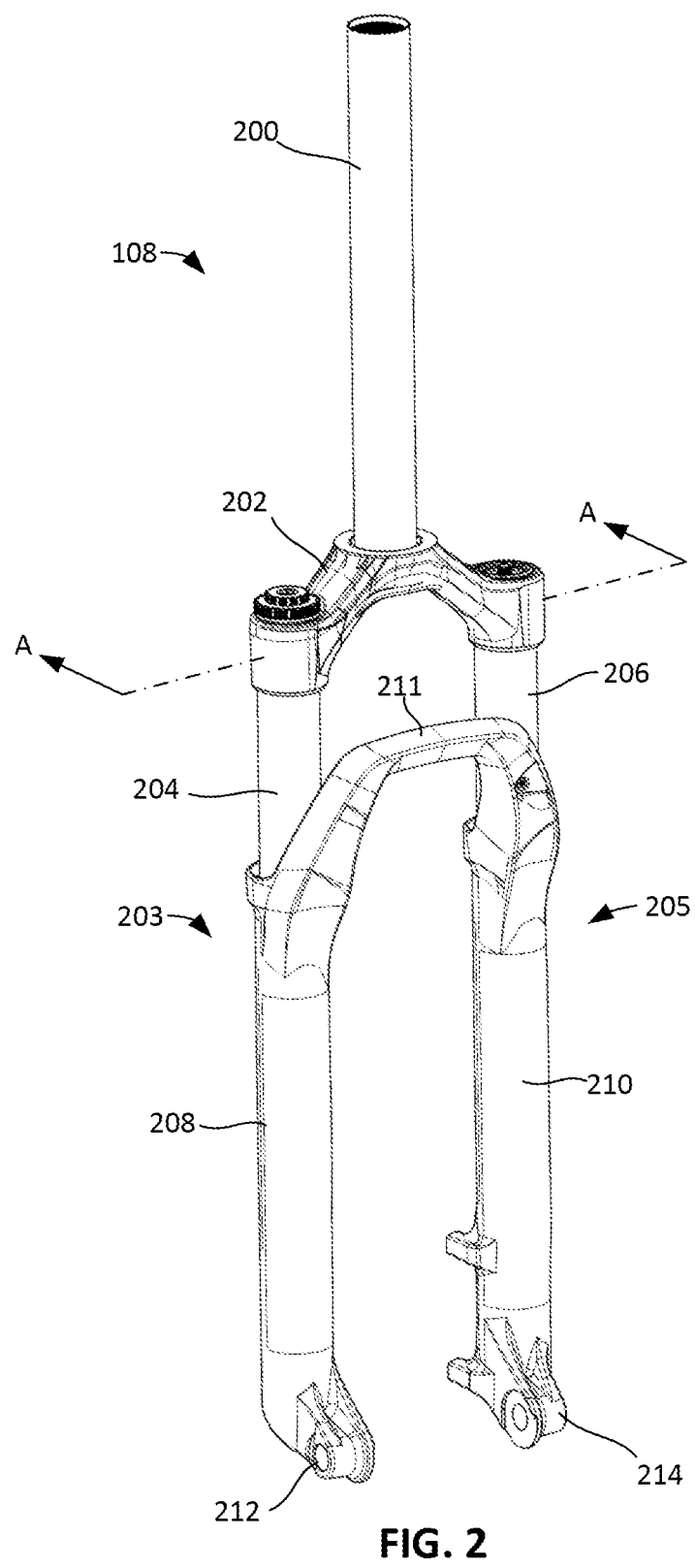
FIG. 2 is perspective view of an example front fork that can be implemented on the example bicycle of FIG. 1.

FIG. 2 is a perspective view of the example front fork 108 (a suspension component) that may incorporate one or more example isolators, disclosed in further detail herein. In the illustrated example of FIG. 2, the front fork 108 includes a steering tube 200, a crown 202, a first leg 203, and a second leg 205. In this example, the first and second legs 203, 205 include first and second upper tubes 204, 206 (sometimes referred to as leg portions or stanchions), respectively, and first and second lower tubes 208, 210 (sometimes referred to as leg portions or lowers), respectively. The first and second upper tubes 204, 206 may be collectively referred to as an upper tube assembly, and the first and second lower tubes 208, 210 may be collectively referred to as a lower tube assembly. The steering tube 200 couples to the frame 102 (FIG. 1) and the handlebars 114 (FIG. 1). The first and second upper tubes 204, 206 are coupled via the crown 202. The first and second lower tubes 208, 210 are coupled via an arch 211 (sometimes referred to as a fork brace or stabilizer). The first and second lower tubes 208, 210 include respective front wheel attachment portions 212, 214, such as holes (e.g., eyelets) or dropouts, for attaching the front wheel 104 (FIG. 1) to the front fork 108. The first and second upper tubes 204, 206 are slidably received within the respective first and second lower tubes 208, 210. Thus, the first and second upper tubes 204, 206 form a telescopic arrangement with the respective first and second lower tubes 208, 210. During a compression stroke, the first and second upper tubes 204, 206 move into or toward the respective first and second lower tubes 208, 210, and during a rebound stroke, the first and second upper tubes 204, 206 move out of or away from the respective first and second lower tubes 208, 210.

Figure 3:
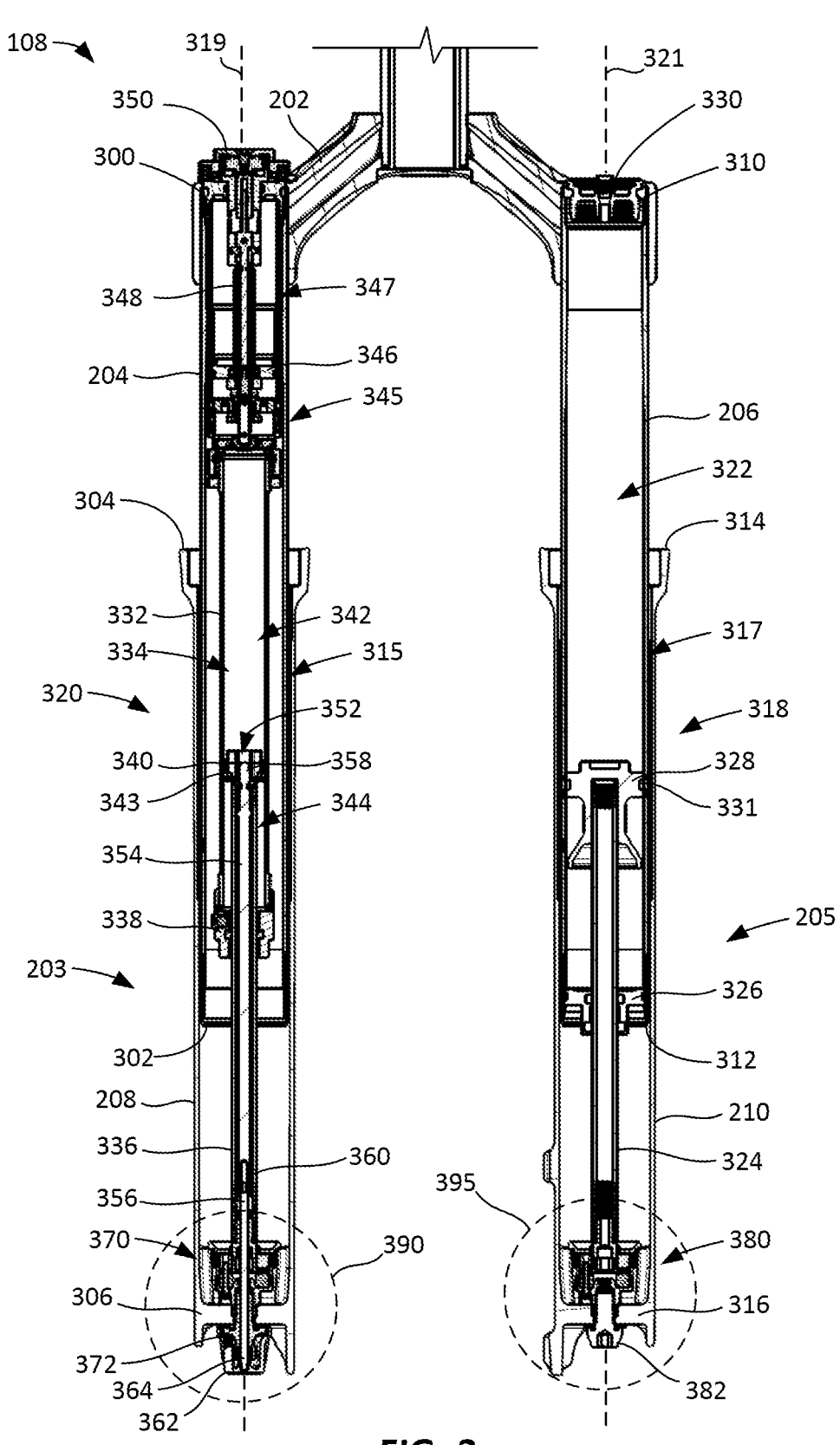
FIG. 3 is a cross-sectional view of the example front fork of FIG. 2 taken along line A-A of FIG. 2.

FIG. 3 is a cross-sectional view of the example front fork 108 taken along line A-A of FIG. 2. As shown in FIG. 3, the first upper tube 204 has a first end 300, referred to herein as a top end 300, and a second end 302, referred to herein as a bottom end 302, opposite the top end 300. The top end 300 is coupled to the crown 202. The first lower tube 208 has a first end 304, referred to herein as a top end 304, and a second end 306, referred to herein as a bottom end 306, opposite the top end 304. The bottom end 302 of the first upper tube 204 is disposed within the first lower tube 208. The top end 300 of the first upper tube 204 and the bottom end 306 of the first lower tube 208 form first and second distal ends of the suspension component. During compression, the top end 300 (the first distal end) and the bottom end 306 (the second distal end) are moved toward each other, and during extension or rebound, the top end 300 and the bottom end 306 are moved away from each other. Thus, the first upper and lower tubes 204, 208 form a telescopic arrangement and define an interior space 315. The first upper and lower legs 204, 208 move along a first translation axis 319. The second upper and lower tubes 206, 210 are similarly arranged. In particular, the second upper tube 206 has a first end 310, referred to herein as a top end 310, and a second end 312, referred to herein as a bottom end 312, opposite the top end 310. The second lower tube 210 has a first end 314, referred to herein as a top end 314, and a second end 316, referred to herein as a bottom end 316, opposite the top end 314. The top end 310 of the second upper tube 206 is coupled to the crown 202, and the bottom end 312 of the second upper tube 206 is disposed within the second lower tube 210. Thus, the first upper and lower tubes 204, 208 form a telescopic arrangement and define an interior space 317. The second upper and lower legs 206, 210 move along a second translation axis 321.

In the illustrated example, the front fork 108 includes both a spring 318 and a damper 320. In this example, the spring 318 is disposed in and/or otherwise integrated into the second upper and lower tubes 206, 210, and the damper 320 is disposed in and/or otherwise integrated into the first upper and lower tubes 204, 208. In particular, the spring 318 is disposed within and/or otherwise defined by the interior space 317 of the second upper and lower tubes 206, 210 bounded by the walls of the second upper and lower tubes 206, 210. Similarly, the damper 320 is disposed within and/or otherwise defined by the interior space 315 formed by the walls of the first upper and lower tubes 204, 208. In other examples, the spring 318 may be disposed in and/or otherwise integrated into the first upper and lower tubes 204, 208 and the damper 320 may be disposed in and/or otherwise integrated into the second upper and lower tubes 206, 210. The spring 318 is configured to resist compression of the top ends 300, 310 toward the bottom ends 306, 316 and return the tubes 204, 206, 208, 210 to the extended position after compression occurs. The damper 320 is configured to limit the speed at which the compression/extension occurs and/or otherwise absorb vibrations.

In this example, the spring 318 is implemented as an air spring formed by a pneumatic chamber 322 in the second upper tube 206. For example, as shown in FIG. 3, the spring 318 includes a shaft 324 (which may be referred to as a spring shaft) that is coupled to and extends upward from the bottom end 316 of the second lower tube 210. The shaft 324 extends through a seal 326 in the bottom end 312 of the second upper tube 206. The spring 318 includes a piston 328 that is coupled (e.g., threadably coupled) to an end of the shaft 324 and disposed in second upper tube 206. The piston 328 is slidable within the second upper tube 206. The pneumatic chamber 322 is formed in the second upper tube 206 between the piston 328 and a top barrier, such as a cap 330, in the top end 310 of the second upper tube 206. In some examples, a seal 331 is disposed around the piston 328, which creates a seal between the piston 328 and the inner surface of the second upper tube 206. In some examples, the pneumatic chamber 228 is filled with a mass of a pneumatic fluid (e.g., a gas, such as air) having a higher pressure than ambient pressure. Therefore, in this example, the pneumatic chamber 228 forms a pressurized chamber (sometimes referred to as a highly pressurized zone or positive spring chamber). When the front fork 108 compresses and the ends of the second upper and lower tubes 206, 210 move toward each other, such as when riding over a bump, the piston 328 moves toward the top end 310 of the second upper tube 206. As a result, the volume of the pneumatic chamber 322 decreases and, thus, the pressure of the fluid within the pneumatic chamber 322 increases. After the compression, the increased pressure acts to push the ends of the second upper and lower tubes 206, 210 away from each other, thereby acting as a spring to return the front fork 108 to its original or riding set up. The first upper and lower tubes 204, 208 similarly follow this motion. In some examples, a negative spring chamber may be formed below the piston 328, between the piston 328 and the seal 326.

In other examples, the spring 318 can be implemented by a physical spring, such as a coil spring. For example, a coil spring can be disposed in the second upper tube 206 between the shaft 324 and the top end 310 of the second upper tube 206. When the front fork 108 is compressed, the shaft 324 is moved upward and compresses the coil spring. After the compression, the coil spring acts to expand the front fork 108 back to its original or riding set up. In other examples, the spring 318 can be implemented by other types of air spring and/or physical spring configurations.

In the illustrated example, the damper 320 includes a damper body 332 defining a chamber 334. The damper body 332 is disposed in and coupled to the first upper tube 204. The chamber 334 is filled with fluid. The fluid may be, for example, oil, such as a mineral oil based damping fluid. In other examples, other types of damping fluids may be used (e.g., silicon or glycol type fluids). The damper 320 includes a shaft 336 (which may be referred to as a damper shaft) that is coupled to and extends upward from the bottom end 306 of the first lower tube 208. The shaft 336 extends through a seal 338 in the bottom of the damper body 332. The damper 320 includes a damper member 340 (sometimes referred to as a piston or mid-valve) that is coupled (e.g., threadably coupled) to an end of the shaft 336 and disposed in the chamber 334. The damper member 340 is slidable in the damper body 332. The damper member 340 divides the chamber 334 into a first chamber 342 and a second chamber 344. In some examples, a seal 343 (e.g., an o-ring) is disposed around the damper member 340 to prevent fluid leakage between the outside of the damper member 340 and the inner surface of the damper body 332. When the front fork 108 compresses and the ends of the first upper and lower tubes 204, 208 move toward each other, such as when riding over a bump, the damper member 340 moves upward in the chamber 334 toward the top end 300 of the first upper tube 204. During rebound, the damper member 340 moves downward in the chamber 334 away from the top end 300 of the first upper tube 204.

The damper member 340 includes one or more channels or fluid flow paths that enable fluid flow across the damper member 340 between the first and second chambers 342, 344. When the front fork 108 is compressed, for example, the fluid is pushed across the damper member 340 and flows from the first chamber 342 to the second chamber 344. Conversely, when the front fork 108 rebounds or expands (e.g., via return force from the spring 318), the fluid is pushed across the damper member 340 and flows from the second chamber 344 to the first chamber 342. The damper member 340 limits the rate of fluid flow between the first and second chambers 342, 344, which dampens movement of the front fork 108 and thereby affects the speed at which the front fork 108 compresses and/or rebounds.

In some examples, the rebound and compression rates of the damper 320 can be independently controlled. For example, as shown in FIG. 3, the damper 320 includes an accumulation chamber 345. In some examples, when the front fork 108 is compressed, such as during a high compression event, the damper member 340 moves upward in the chamber 334 and forces the fluid in the first chamber 342 through a top of the damper body 332 and into the accumulation chamber 345. The damper 320 includes an internal floating piston (IFP) 346 in the first upper tube 204 that can slide upward or downward to change the volume of the accumulation chamber 345. In some examples, the damper 320 includes a spring 347 (e.g., an air spring) that biases the IFP 346 downward. In some examples, the resistance of the spring 347 can be adjusted via a compression adjust rod 348. A compression adjustment knob 350 is coupled to the compression adjust rod 348. A user (e.g., a rider) can interact with (e.g., twist, push, etc.) the compression adjustment knob 350 to change the resistance of the IFP 346 and, thus, affect compression damping rate.

In some examples, the damper member 340 can independently control the rebound damping rate. For example, the damper member 340 may include one or more fluid flow paths that enable fluid flow from the second chamber 344 to the first chamber 342 when compression occurs. The one or more fluid flow paths can be covered by one or more shims to provide relatively low damping during compression. The damper member 340 may also include an adjustable orifice 352 that controls the flow of fluid in the reverse direction, from the first chamber 342 to the second chamber 344. This adjustable orifice 352 can be opened or closed to affect the rebound damping rate. For example, the damper 320 includes a first rebound adjust rod 354 and a second rebound adjust rod 356. The first rebound adjust rod 354 is movably disposed in the shaft 336. A plug 358 on the first rebound adjust rod 354 is disposed in the damper member 340 and controls the size of the adjustable orifice 352. In particular, the first rebound adjust rod 354 can be moved axially (e.g., up or down) in the shaft 336 to change the size of the adjustable orifice 352. In this example, the first rebound adjust rod 354 is threadably engaged with the shaft 336. If the first rebound adjust rod 354 is rotated, the first rebound adjust rod 354 moves axially in the shaft 336, thereby controlling the size of the adjustable orifice 352 in the damper member 340. The second rebound adjust rod 356 is also disposed in the shaft 336. The second rebound adjust rod 356 is coupled to a bottom end 360 of the first rebound adjust rod 354. In some examples, the second rebound adjust rod 356 is inserted into a keyed slot in the bottom end 360 of the first rebound adjust rod 354. This enables the second rebound adjust rod 356 to rotate the first rebound adjust rod 354, but also allows the first rebound adjust rod 354 to move axially toward or away from the second rebound adjust rod 356. The second rebound adjust rod 356 extends through the bottom end 306 of the first lower tube 208. In the illustrated example, a rebound adjustment knob 362 is coupled to a bottom end 364 of the second rebound adjust rod 356. A user (e.g., a rider) can rotate (e.g., twist) the rebound adjustment knob 362 to rotate the second rebound adjust rod 356. When the second rebound adjust rod 356 is rotated, the second rebound adjust rod 356 rotates the first rebound adjust rod 354, which causes the first rebound adjust rod 354 to move axially up or down in the shaft 336 relative to the damper member 340, which opens or closes the adjustable orifice 352 and, thus, changes the rebound damping rate.

As disclosed above, the spring 318 and the damper 320 include multiple seals (e.g., the seals 326, 331, 338, 343, etc.). These seals have a static friction that must be overcome to compress or expand the front fork 108. While relatively small, this static friction may cause a delay in the compression or rebound movement. For example, if a compressive force is applied to the front fork 108, the upper and lower tubes 204, 206, 208, 210 may remain in the same relationship (i.e., no movement) until the force builds enough to overcome the static friction. Once the static friction is overcome, the components of the spring 318 and the damper 320 move (e.g., slide), which enables the upper and lower tubes 204, 206, 208, 210 to move relative to each other. This delay may cause an undesirable stick slip feeling that can be felt by the rider. Additionally, high frequency vibrations (e.g., above 5 Hz) having a low amplitude may be not absorbed by the spring 318 and the damper 320. Instead, these high frequency vibrations are transmitted through the front fork 108 to the handlebars 114 (FIG. 1) and are felt by the rider.

To address the above-noted drawbacks, the front fork 108 includes a first example isolator 370. In this example, the first isolator 370 is associated with the damper 320 in the first leg 203. The first isolator 370 couples the shaft 336 to the bottom end 306 of second lower tube 208. In the illustrated example, the first isolator 370 is disposed in the second lower tube 208, between the shaft 336 and the bottom end 306 of the second lower tube 208. In some examples, it is advantageous to have the first isolator 370 in the first lower tube 208 because the first lower tube 208 protects the first isolator 370 from dirt, debris, and other materials in the surrounding environment. The first isolator 370 enables relative movement between the first lower tube 208 (which is attached to the front wheel 104 and considered the unspring side of the suspension component) and the shaft 336, which is coupled to the damper member 340. Thus, the first isolator 370 acts as a spring in series with the damper 320. The first isolator 370 is aligned on the first translation axis 319 and controls the movement of the first upper and lower legs 204, 208 along the first translation axis 319. In this example, the first isolator 370 is coupled to the bottom end 306 of the first lower tube 208 via a first threaded fastener 372 (e.g., a bolt). The first threaded fastener 372 is disposed outside of the first lower tube 208. The first isolator 370 and the first threaded fastener 372 include central openings (shown in further detail herein) through which the second rebound adjust rod 356 extends. In other examples, if an adjustable damper member is not included, the first isolator 370 and the first threaded fastener 372 may not include such openings.

As disclosed in further detail herein, the first isolator 370 includes one or more cushioning members, such as elastomeric members (e.g., rubber pads). The elastomeric member(s) of the first isolator 370 enable(s) relative movement between the first lower tube 208 and the shaft 336 and, thus, between the first upper and lower tubes 204, 208. As such, the first isolator 370 enables the second lower tube 208 (the unspring mass) to move upward relative to the first upper tube 204 before the breakaway force for the spring 318 and the damper 320 is reached, thereby enabling the front fork 108 absorb the vibrations more quickly during compression. The first isolator 370 also absorbs high frequency, low amplitude vibrations that would otherwise be transmitted through the first upper and lower tubes 204, 208 to the handlebars 114 (FIG. 1). Therefore, the first isolator 370 is frequency sensitive. In particular, long and slow inputs are partially absorbed by the first isolator 370 and transmitted to the damper 320, whereas fast and short inputs are absorbed just in the first isolator 370. As a result, the first isolator 370 reduces vibrations felt at the handlebars 114.

In this example, the front fork 108 includes a second isolator 380 associated with the spring 318 in the second leg 205. The second isolator 380 couples the shaft 324 to the bottom end 316 of the second lower tube 210. In particular, the second isolator 380 is disposed in the second lower tube 210, between the shaft 324 and the bottom end 316 of the second lower tube 210. The second isolator 380 acts as a spring in series with the spring 318. The second isolator 380 is aligned on the second translation axis 321 and controls the movement of the second upper and lower legs 206, 210 along the second translation axis 321. In this example, the second isolator 380 is coupled to the bottom end 316 of the second lower tube 210 via a second threaded fastener 382 (e.g., a bolt). The second isolator 380 is substantially the same as the first isolator 370, but the second isolator 380 and/or the second threaded fastener 382 may not include central openings for an adjustment rod. The second isolator 380 similarly allows relative movement between the second lower tube 210 and the shaft 324 and, thus, between the second upper and lower tubes 206, 210.

In the illustrated example, the front fork 108 includes two isolators, one for the damper 320 and one for the spring 318. However, in other examples, the front fork 108 may only include one isolator. For example, only the first isolator 370 or only the second isolator 380 may be implemented.

Figure 4:
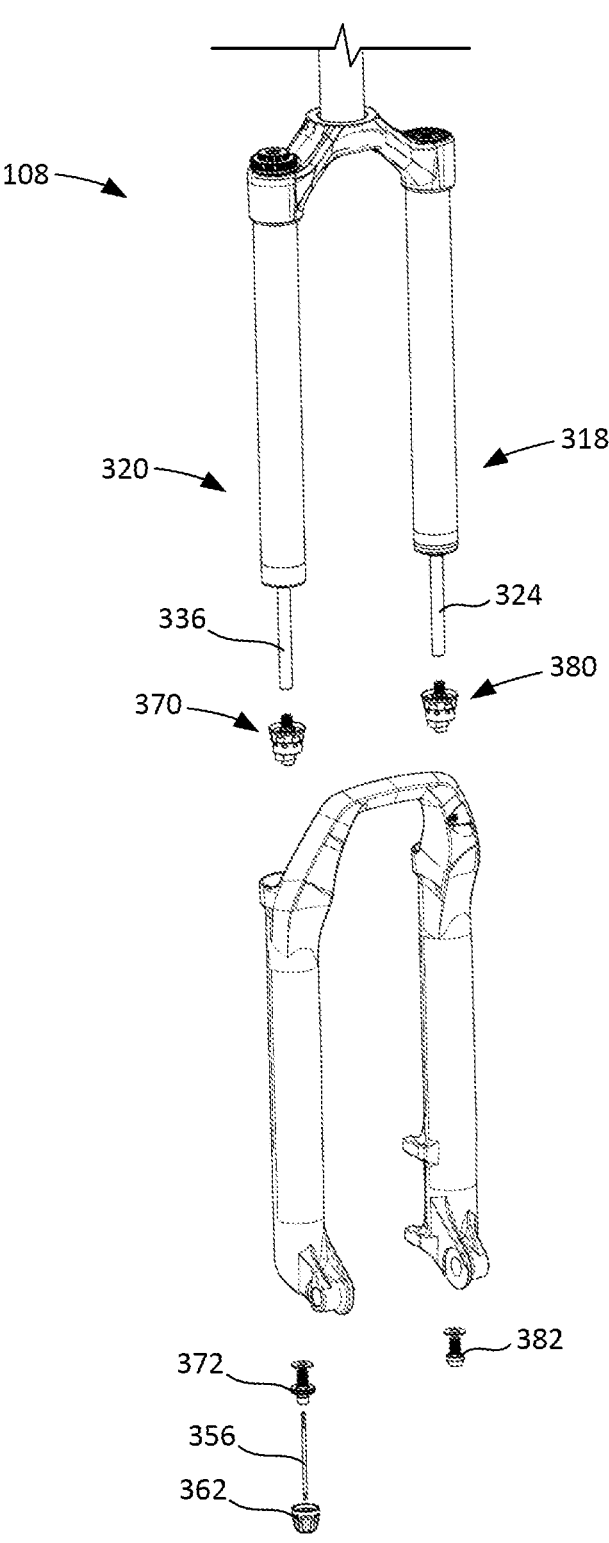
FIG. 4 is a partially exploded view of the example front fork of FIG. 2 showing first and second example isolators.

FIG. 4 is a partially exploded view of the front fork 108. FIG. 4 shows the first isolator 370 separated from the shaft 336 of the damper 320, and the second isolator 380 separated from the shaft 324 of the spring 318. FIG. 4 also shows the first and second threaded fasteners 372, 382, the second rebound adjust rod 356, and the rebound adjustment knob 362.

Figure 5:
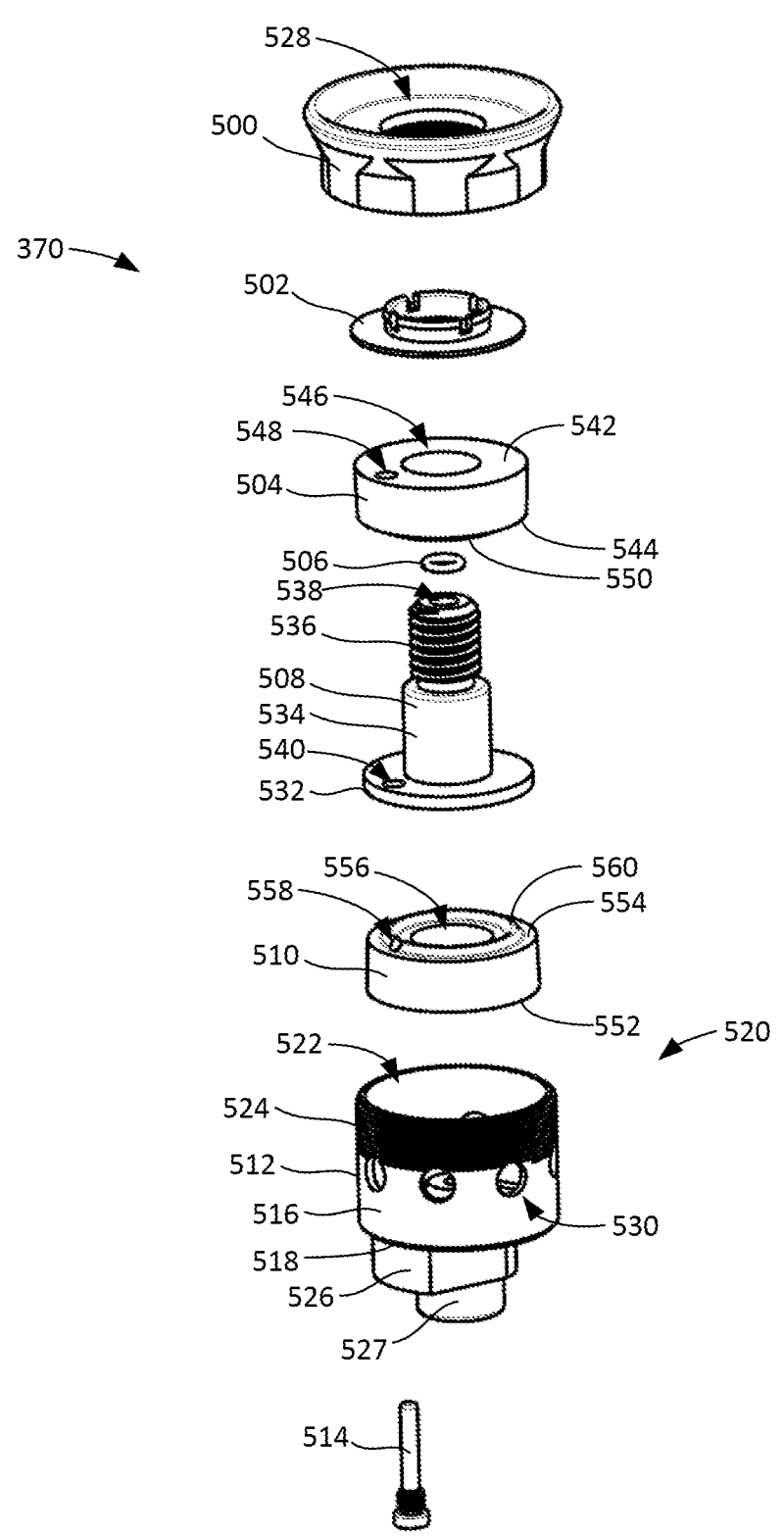
FIG. 5 is an exploded view of the first example isolator of FIG. 4.

FIG. 5 is an exploded view of the first isolator 370. In the illustrated example, the first isolator 370 includes a cap 500, a bushing 502, a first cushioning member 504, a seal 506, a translating coupler 508, a second cushioning member 510, a cup 512, and a pin 514. In this example, the first and second cushioning members 504, 510 are implemented as elastomeric members, referred to herein as a first elastomeric member 504 and a second elastomeric member 510. In the illustrated example, the cup 512 has a side wall 516 and a bottom 518. When the first isolator 370 is assembled, the cap 500 is coupled to the cup 512 and forms a housing 520 defining a cavity 522. In this example, the cap 500 is screwed onto a threaded section 524 on the side wall 516 of the cup 512. In other examples, the cap 500 can be coupled to the cup 512 via other mechanical and/or chemical fastening techniques. The housing 520 is to be coupled to the bottom end 306 (FIG. 3) of the first lower tube 208 (FIG. 3). In the illustrated example, the cup 512 has an extension 526 and a boss 527 extending from the bottom 518. The extension 526 and the boss 527 include an opening to receive the first threaded fastener 372 (FIG. 3), as shown in further detail in connection with FIG. 7. In this example, the translating coupler 508 is implemented as a bolt, referred to herein as a translating bolt 508 that has a threaded section (disclosed in further detail herein). However, in other examples, the translating coupler 508 may not have a threaded section.

When the first isolator 370 is assembled, the first and second elastomeric members 504, 510 and a portion of the translating bolt 508 are disposed in the cavity 522 of the housing 520. The cap 500 of the housing 520 has an opening 528 through which the translating bolt 508 extends when the first isolator 370 is assembled. The bushing 502 is to be disposed in the opening 528 of the cap 500 to enable the translating bolt 508 to slide relative to the cap 500, which reduces wear on the cap 500 and the translating bolt 508.

In the illustrated example, the side wall 516 of the cup 512 has a plurality of radial openings 530 (one of which is referenced in FIG. 5). The cup 512 may include any number of openings 530. In some examples, the openings 530 are spaced equidistant around the side wall 516. In some examples, the openings 530 enable fluid or gas in the cavity 522 to be equalized as the first and second elastomeric members 504, 510 compress or expand. For example, in some instances, the bottom of the first lower tube 208 contains lubrication oil. The openings 530 can equalize the pressure inside and outside of the housing 520 as the first and second elastomeric members 504, 510 compress or expand. This also improves heat dissipation. Further, the openings 530 reduce the weight of the housing 520 and, thus, reduce the total weight of the first isolator 370. In other examples, the housing 520 may not include the openings 530.

In the illustrated example, the translating bolt 508 has a plate 532 (e.g., a flange, a disk) and a post 534 with a threaded section 536. The translating bolt 508 includes an opening 538 through the plate 532 and the post 534 to receive the second rebound adjust rod 356 (FIG. 3). When the first isolator 370 is assembled, the plate 532 is disposed (e.g., clamped) between the first and second elastomeric members 504, 510 in the cavity 522 of the housing 520, and the post 534 with the threaded section 536 extends outward through the opening 528 in the cap 500. The shaft 336 (FIG. 3) of the damper 320 (FIG. 3) is to be threadably coupled to the threaded section 536 of the translating bolt 508. In the illustrated example, the plate 532 has an opening 540 to receive the pin 514, as shown in further detail in connection with FIG. 7. In some examples, the translating bolt 508 is constructed as a single unitary part or component. In other examples the plate 532 and the post 534 can be constructed as separate components that are coupled together.

In the illustrated example, the first and second elastomeric member 504, 510 are ring-shaped. In this example, the first and second elastomeric members 504, 510 are identical, but oriented in opposite directions. Therefore, any of the details disclosed in connection with the first elastomeric member 504 can likewise apply to the second elastomeric member 510. In the illustrated example, the first elastomeric member 504 has a first side 542, a second side 544, and a central opening 546 extending between the first and second sides 542, 544. The first elastomeric member 504 also has an opening 548 to receive the pin 514, as disclosed in further detail herein. In the illustrated example, the first elastomeric member 504 has a first rib 550 extending or protruding from the second side 544.

Figures 6A, 6B, 6C:
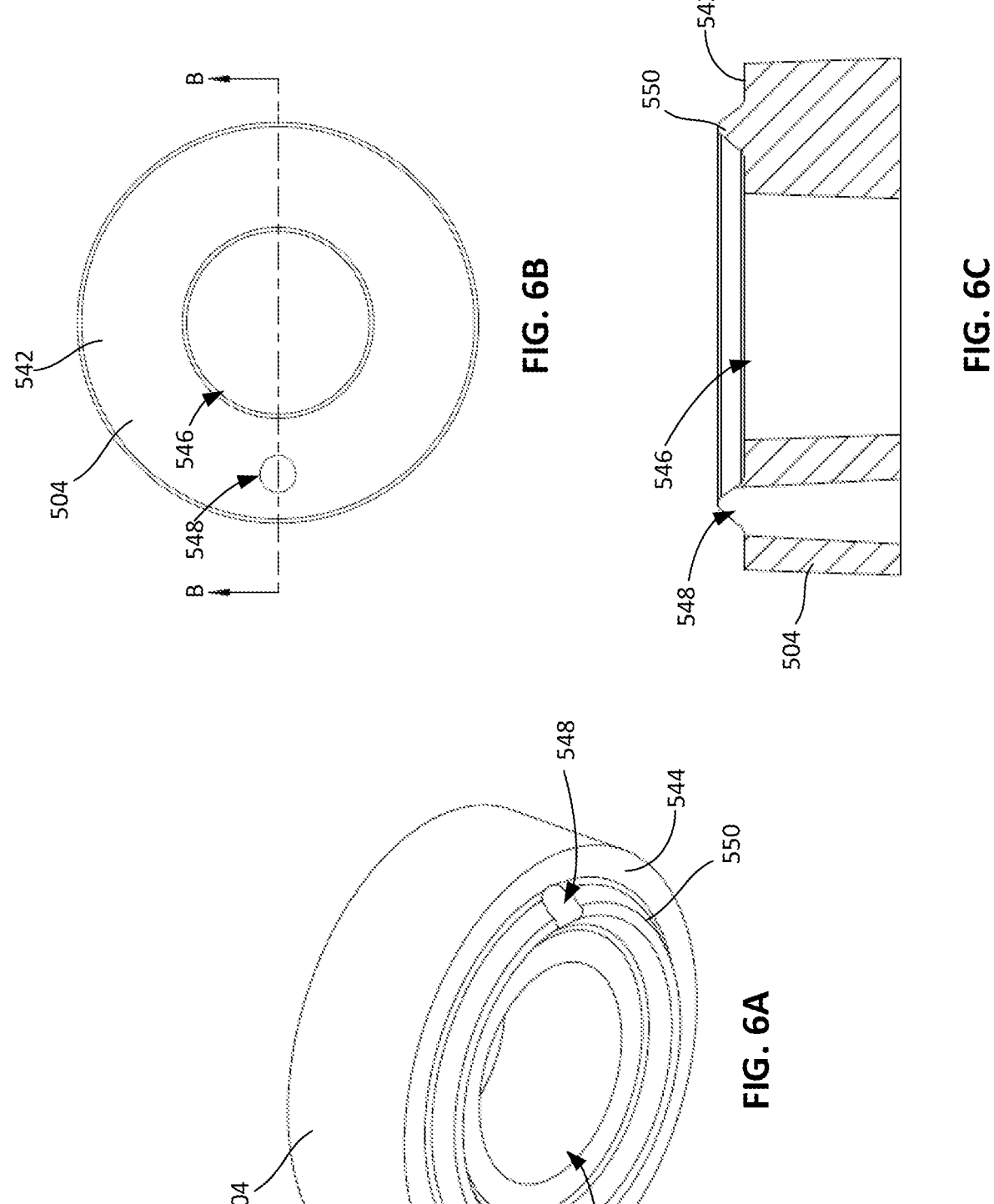
FIG. 6A is a perspective view of an example elastomeric member of the first example isolator of FIG. 5.
FIG. 6B is a top view of the example elastomeric member of FIG. 6A.
FIG. 6C is a cross-sectional view of the example elastomeric member of FIGS. 6A and 6B taken along line B-B of FIG. 6B.

Referring briefly to FIGS. 6A-6C, FIG. 6A is a perspective view of the first elastomeric member 504, FIG. 6B is a top view of the first side 542 of the first elastomeric member 504, and FIG. 6C is a cross-sectional view of the first elastomeric member 504 taken along line B-B of FIG. 6B (and turned up-side down). FIGS. 6A-6C show the openings 546, 548 extending through first elastomeric member 504. FIGS. 6A and 6C show the first rib 550 that protrudes from the second side 544. In some examples, the first rib 550 helps to maintain contact between the first elastomeric member 504 and the translating bolt 508, as disclosed in further detail herein. In other examples, the first rib 550 may not be included. Referring back to FIG. 5, the second elastomeric member 510 similarly has a first side 552, a second side 554, a central opening 556 and an opening 558 extending between the first and second sides 552, 554, and a rib 560 extending from the second side 554. When the first isolator 370 is assembled, the plate 532 of the translating bolt 508 is clamped between the second sides 544, 554 of the first and second elastomeric members 504, 510. Thus, the first elastomeric member 504 has the first rib 550 extending from the second side 544 of the first elastomeric member 504 facing the plate 532, and the second elastomeric member 510 has the second rib 560 extending from the second side 554 of the second elastomeric member 510 facing the plate 532.

Figure 7:
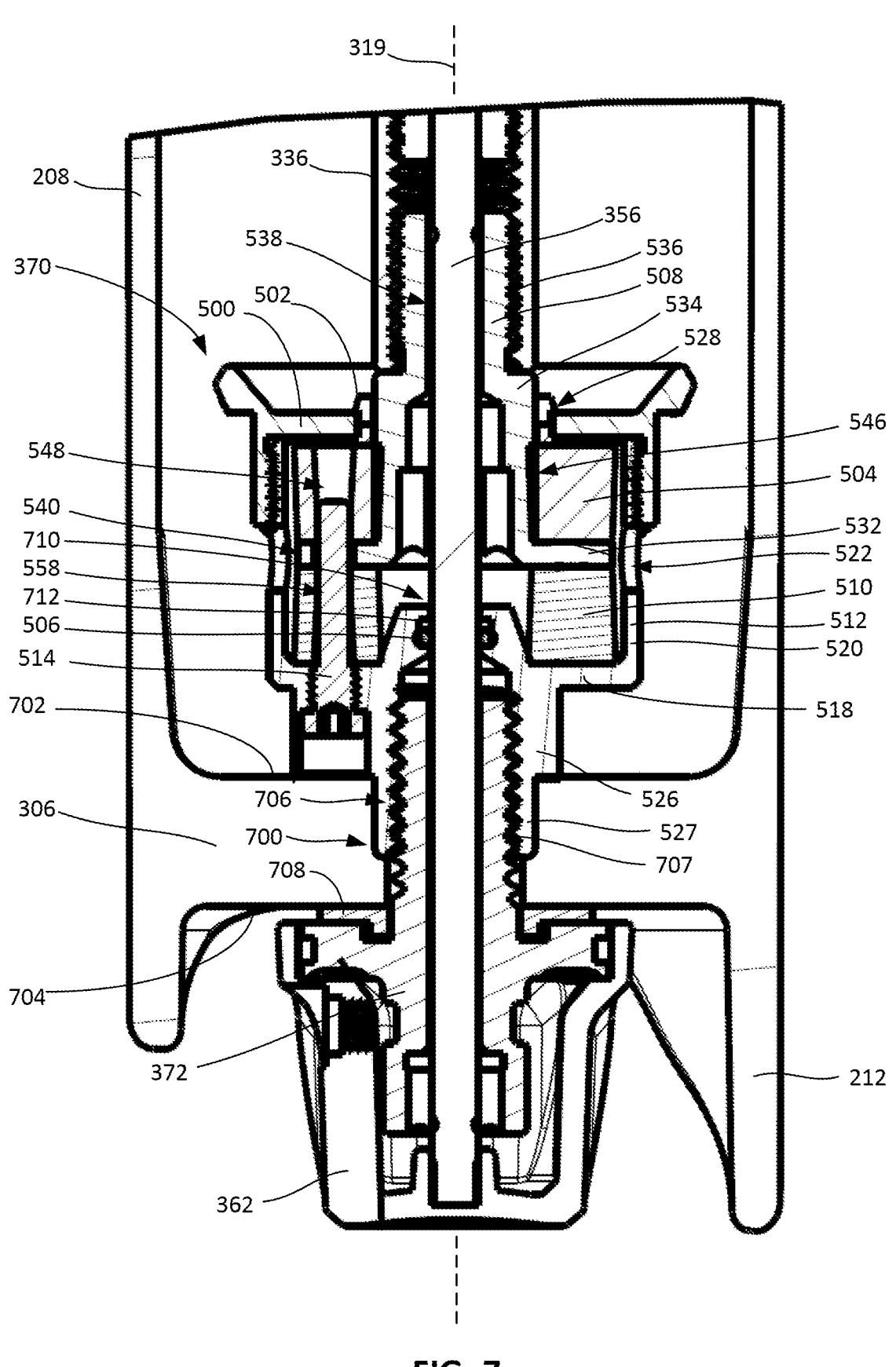
FIG. 7 is an enlarged view of the first callout in FIG. 2 showing the first example isolator associated with an example damper in the example front fork.

FIG. 7 is an enlarged view of the callout 390 of FIG. 3 showing the first isolator 370 in the first lower tube 208. As disclosed above, the first isolator 370 couples the shaft 336 to the bottom end 306 of the first lower tube 208. In particular, the housing 520 of the first isolator 370 is rigidly coupled to the bottom end 306, and the translating bolt 508 is rigidly coupled to the shaft 336.

In the illustrated example, the first lower tube 208 has an opening 700 extending between a first side 702 (an internal side) and a second side 704 (an external side) of the bottom end 306. As shown in FIG. 7, the front wheel attachment portion 212 extends from the second side 704 of the bottom end 306. The front wheel attachment portion 212 is to be coupled to a hub on the front wheel 104 (FIG. 1) of the bicycle 100 (FIG. 1). As shown in FIG. 7, the cap 500 is threaded onto the cup 512, which forms the housing 520. The extension 526 of the housing 520 is engaged with the first side 702 of the bottom end 306, and the boss 527 extends into the opening 700 in the bottom end 306. In other examples, the extension 526 may be removed, and the bottom 518 of the housing 520 may be engaged with the first side 702 of the bottom end 306. In some examples, the boss 527 is press fit into the opening 700 of the first lower tube 208, such that the housing 520 is fixedly coupled to the bottom end 306 of the first lower tube 208. In some examples, the boss 527 and the opening 700 in the first lower tube 208 form a locking taper. In the illustrated example, the housing 520 has an opening 706 through the extension 526 and the boss 527 and into the cavity 522. The first threaded fastener 372 is disposed outside of (external to) the first lower tube 208. The first threaded fastener 372 is inserted into the opening 700 through the second side 704 of the bottom end 306. The first threaded fastener 372 is screwed into a threaded section 707 in the opening 706 of the boss 527. The first threaded fastener 372 can be torqued to rigidly secure the housing 520 to the bottom end 306 of the first lower tube 208. In some examples, a washer 708 is disposed between the first threaded fastener 372 and the second side 704 of the bottom end 306.

As shown in FIG. 7, the first and second elastomeric members 504, 510 are disposed in the cavity 522 and clamped (e.g., axially constrained) between the cap 500 and the bottom 518 of the cup 512. The plate 532 is disposed between the first and second elastomeric members 504, 510. The post 534 of the translating bolt 508 extends upward through the central opening 546 in the first elastomeric member 504 and through the opening 528 in the cap 500 of the housing 520, and the post 534 is coupled to an end of the shaft 336. The translating bolt 508 is movable up and down relative to the housing 520 and the cap 500 along the first translation axis 319. The bushing 502 is disposed in the opening 528 in the cap 500. The translating bolt 508 is slidable on the bushing 502. The bushing 502 forms a low friction surface for the translating bolt 508 to slide relative to the housing 520. This reduces wear on the translating bolt 508 and the housing 520. The bushing 502 can be constructed of any material. In some examples, the bushing 502 is constructed of Teflon®. In other examples, the bushing 502 can be constructed of another material, such as Delrin®.

As shown in FIG. 7, the translating bolt is coupled to the shaft 336 of the damper 320 (FIG. 3). In particular, the threaded section 536 of the post 534 is threadably coupled to the shaft 336. As such, the translating bolt 508 and the shaft 336 are rigidly coupled. The first and second elastomeric members 504, 510 are engaged with opposite sides of the plate 532. Therefore, the first elastomeric member biases the plate 532 (and, thus, the translating bolt 508 and the shaft 336) downward, and the second elastomeric member 510 biases the plate 532 in the opposite direction. In some examples, the first and second elastomeric members 504, 510 are preloaded (i.e., in a slightly compressed state).

The first and second elastomeric members 504, 510 can be constructed of any elastomeric material. In some examples, the first and second elastomeric member 504, 510 are constructed of nitrile rubber (e.g., 40 Shore A nitrile rubber). In other examples, the first and second elastomeric members 504, 510 can be constructed of other types of rubber (e.g., butyl rubber, ethylene propylene diene monomer (EPDM) rubber, etc.), silicone, polyurethane, or a viscoelastic material. In some examples, the first and second elastomeric members 504, 510 have the same hardness. For example, the first and second elastomeric members 504, 510 may have a durometer of about 40 Shore A (e.g., ±5). In other examples, the first and second elastomeric members 504, 510 can have a higher or lower durometer. In other examples, the first and second elastomeric members 504, 510 can have a different hardness. For example, the first elastomeric member 504 may have a hardness of a first durometer, and the second elastomeric member 510 may have a hardness of a second durometer that is higher than the first durometer.

The first and second elastomeric members 504, 510 compress and expand in response to compression and rebound forces. For example, when a compressive force is first applied to the front fork 108 (e.g., when riding over a bump), the housing 520 is forced upward and/or the translating bolt 508 is forced downward. Before the breakaway force is reached, the second elastomeric member 510 is compressed between the bottom 518 of the housing 520 and the plate 532 of the translating bolt 508, which enables the first lower tube 208 to move upward relative to the shaft 336 and, thus, upward relative to the first upper tube 204 (FIG. 2). Further, because the plate 532 is moved away from the first elastomeric member 504, the first elastomeric member 504 expands. After the compressive force is removed, the second elastomeric member 510 biases the bottom 518 of the housing 520 and the plate 532 away from each other, which moves the first lower tube 208 downward relative to the shaft 336 and, thus, downward relative to the first upper tube 204. Similarly, when a rebound (expanding) force is applied to the front fork 108 (e.g., from the spring 318 (FIG.

3), the first and second elastomeric members 504, 510 enable relative movement of the first upper and lower tubes 204, 208 in the opposite direction. Therefore, the first and second elastomeric members 504, 510 control and define the movement along the first translation axis 319. In some examples, the translating bolt 508 and the housing 520 are movable about 4 mm relative to each other (and, thus, allows about 4 mm of travel between the first upper and lower tubes 204, 208). In other examples, depending on the magnitude of the force, the hardness of the first and second elastomeric members 504, 510, and/or the breakaway force of the spring 318 and the damper 320, the relative movement may be larger or smaller. In this manner, the first isolator 370 enables relative movement between the first upper and lower tubes 204, 208 before the breakaway forces of the spring 318 and the damper 320 (FIG. 3) are reached. In particular, because the first and second elastomeric members 504, 510 are disposed on opposite sides of the plate 532, the net force to initiate movement in either direction is zero. Therefore, unlike known front forks, the example front fork 108 does not require a certain force to overcome some friction or breakaway force to initiate movement. Instead, any net compressive or expansive force can result in relative movement of the first upper and lower tubes 204, 208. This results in less vibrations or shocks transmitted through the front fork 108 to the handlebars 114 (FIG. 1).

The first and second elastomeric members 504, 510 also absorb high frequency, low amplitude vibrations that may otherwise not be absorbed by the front fork 108. For example, if riding over a washboard terrain, the first and second elastomeric members 504, 510 enable the first lower tube 208 to flutter relative to the first upper tube 204. As such, these high frequency, lower amplitude vibrations are not transmitted to the handlebars 114 (FIG. 1). Further, by having the first and second elastomer member 504, 510 on opposite sides of the plate 532, rather than just one on one side, this arrangement reduces any gap behind the plate 532 that could cause an impact upon release of force. Therefore, in some examples, having an elastomeric member on both sides of the plate 532 results in a more stable and smooth movement. Also, as disclosed above, the first and second elastomeric members 504, 510 have the respective first and second ribs 550, 560 (FIG. 5). The first and second ribs 550, 560 help maintain contact between the respective first and second elastomeric members 504, 510 and the plate 532. For example, during a compressive force, the plate 532 is moved downward and away from the first elastomeric member 504. In such an instance, the first elastomeric member 504 expands. While the plate 532 may separate from the second side 544 (FIG. 5) of the first elastomeric member 504, the first rib 550 maintains contact with the plate 532. Therefore, when the compressive force is removed and the plate 532 moves back upward, there is no gap between the plate 532 and the first elastomeric member 504. As the plate 532 moves upward, the plate 532 may compress the first rib 550 into the second side 544 of the first elastomeric member 504. This ensures a smooth, stabilized movement between the translating bolt 508 and the housing 520 and, thus, between the first upper and lower tubes 204, 208. However, in other examples, only one elastomeric member may be implemented. For example, in some instances, only the first elastomeric member 504 may be included. Further, while in this example the cushioning members are implemented as the first and second elastomeric members 504, 510, in other examples, the cushioning member can be implemented as springs (e.g., metallic coil springs, leaf springs, etc.) or other types of cushioning members that produce biased movement between two components.

As shown in FIG. 7, the second rebound adjust rod 356 extends through the first threaded fastener 372 and the first isolator 370. In particular, the second rebound adjust rod 356 extends through the housing 520, the first and second elastomeric members 504, 510, and the opening 538 in the translating bolt 308. The second rebound adjust rod 356 is rotatable to adjust a fluid flow rate across the damper member 340 (FIG. 3). As shown in FIG. 7, the rebound adjust rod 356 extends through an opening 710 in the bottom 518 of the housing 520. The seal 506 is disposed in a seal gland 712 (e.g., a groove or recess) formed in the housing 520. The seal 506 prevents leakage of fluid (e.g., lube oil) and helps maintain casting ramp pressure inside of the first lower tube 208. As disclosed above, the rebound adjustment knob 362 is coupled to the second rebound adjust rod 356. The rebound adjustment knob 362 is disposed over the first threaded fastener 372 and is rotatable independent of the first threaded fastener 372. A user can rotate the rebound adjustment knob 362 to rotate the second rebound adjust rod 356, thereby rotating the first rebound adjust rod 354 (FIG. 3) to change the rebound damping rate. In some examples, the second rebound adjust rod 356 is fixedly coupled to the rebound adjustment knob 362. Therefore, the second rebound adjust rod 356 can rotate relative to the first lower tube 208, but does not move axially up or down relative to the first lower tube 208.

In some instances, the friction between the second rebound adjust rod 356 and the translating bolt 508 could cause the translating bolt 508 and the shaft 336 to rotate, which is undesired. For example, under normal operation, the second rebound adjust rod 356 is rotated until the plug 358 (FIG. 3) is fully closed and hits a hard stop. This hard stop is felt by the user as an indication that the valve is fully closed, and can be used to measure the rotation (e.g., detent clicks) away from the fully closed position. However, the friction may cause the translating bolt 308 and the shaft 336 to spin, such that the user may not be able to tell the plug 358 is fully closed. To prevent this rotation, the first isolator 370 includes an anti-rotation device. In this example, the anti-rotation device is implemented as the pin 514. The pin 514 is coupled to the housing 520. In particular, as shown in FIG. 7, the pin 514 is screwed into the bottom 518 of the housing 520. The pin 514 extends through the opening 558 in the second elastomeric member 510, the opening 540 in the plate 532 of the translating bolt 508, and into the opening 548 in the first elastomeric member 504. The pin 514 prevents the first and second elastomeric members 504, 510 and the translating bolt 508 from rotating relative to the housing 520. Additionally or alternatively, other structures can be used to prevent rotation. For example, one or more interlocking structures, such as teeth, can be formed on the cap 500, the first and second elastomeric members 504, 510, the plate 532, and/or the bottom 518 of the housing 520. Such teeth can mesh to prevent rotation of the translating bolt 508 relative to the housing 520. In another example, the outer radial edge of the plate 532 can be splined with the inner surface of the side wall 516 of the housing 520.

Figure 8:
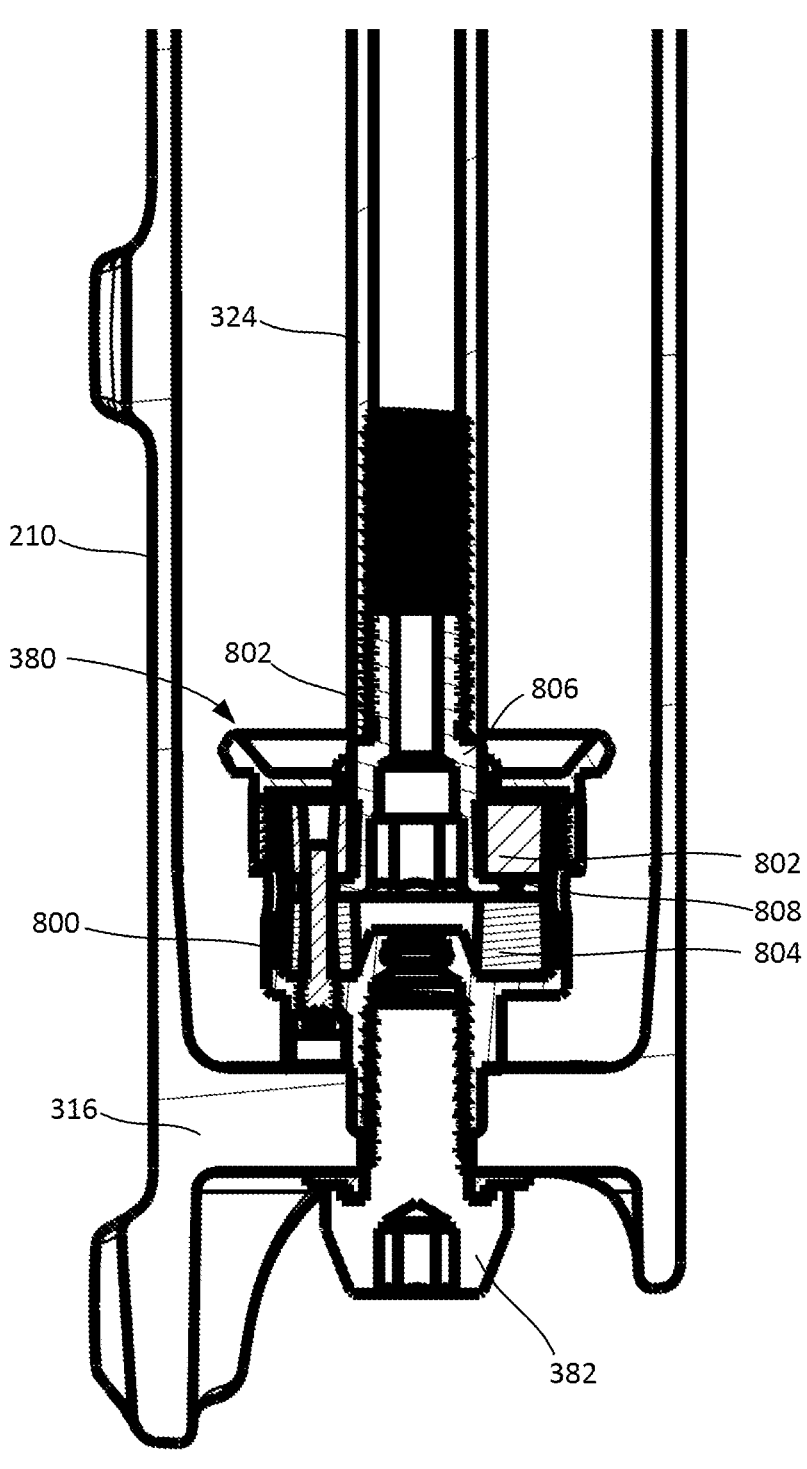
FIG. 8 is an enlarged view of the second callout in FIG. 2 showing the second example isolator associated with an example spring in the example front fork.

FIG. 8 is an enlarged view of the callout 395 of FIG. 3 showing the second isolator 380 in the second lower tube 210. As disclosed above, the second isolator 380 couples the shaft 324 to the bottom end 316 of the second lower tube 210. The second isolator 380 includes a second housing 800, third and fourth elastomeric members 802, 804, and a second translating bolt 806. The second housing 800 is rigidly coupled to the bottom end 316 via the second threaded fastener 382. The second translating bolt 806 is rigidly coupled to the shaft 324. The second translating bolt 806 has a second plate 808 that is disposed between the third and fourth elastomeric members 802, 804. The second isolator 380 is substantially the same as the first isolator 370 and acts to absorb vibrations and enable movement between the second upper and lower tubes 206, 210. Therefore, to avoid redundancy, a description of the same structures and functions of the second isolator 380 is not repeated. Instead, it is understood that any of the structure or functions disclosed in connection with the first isolator 370 and the first upper and lower tubes 204, 208 can likewise apply to the second isolator 380 and the second upper and lower tubes 206, 210. In this example, the spring 318 does not include an adjust rod, so the second threaded fastener 382 does not include an opening like the first threaded fastener 372 shown in FIG. 7.

In some examples, the third and fourth elastomeric members 802, 804 have the same hardness (e.g., 40 Shore A). In other example, the third and fourth elastomeric members 802, 804 have a different hardness. In some examples, the fourth elastomeric member 804 is harder than the third elastomeric member 802. For example, the third elastomeric member 802 may have a durometer of 40 Shore A, and the fourth elastomeric member 804 may have a durometer of 70 Shore A. In some examples, the fourth elastomeric member 804 is harder than the third elastomeric member 802 because the spring 318 (FIG. 3) applies a constant force on the fourth elastomeric member 804. Therefore, the fourth elastomeric member 804 is constructed of a material having a higher durometer, which is generally more durable than a lower durometer material.

Figure 9:
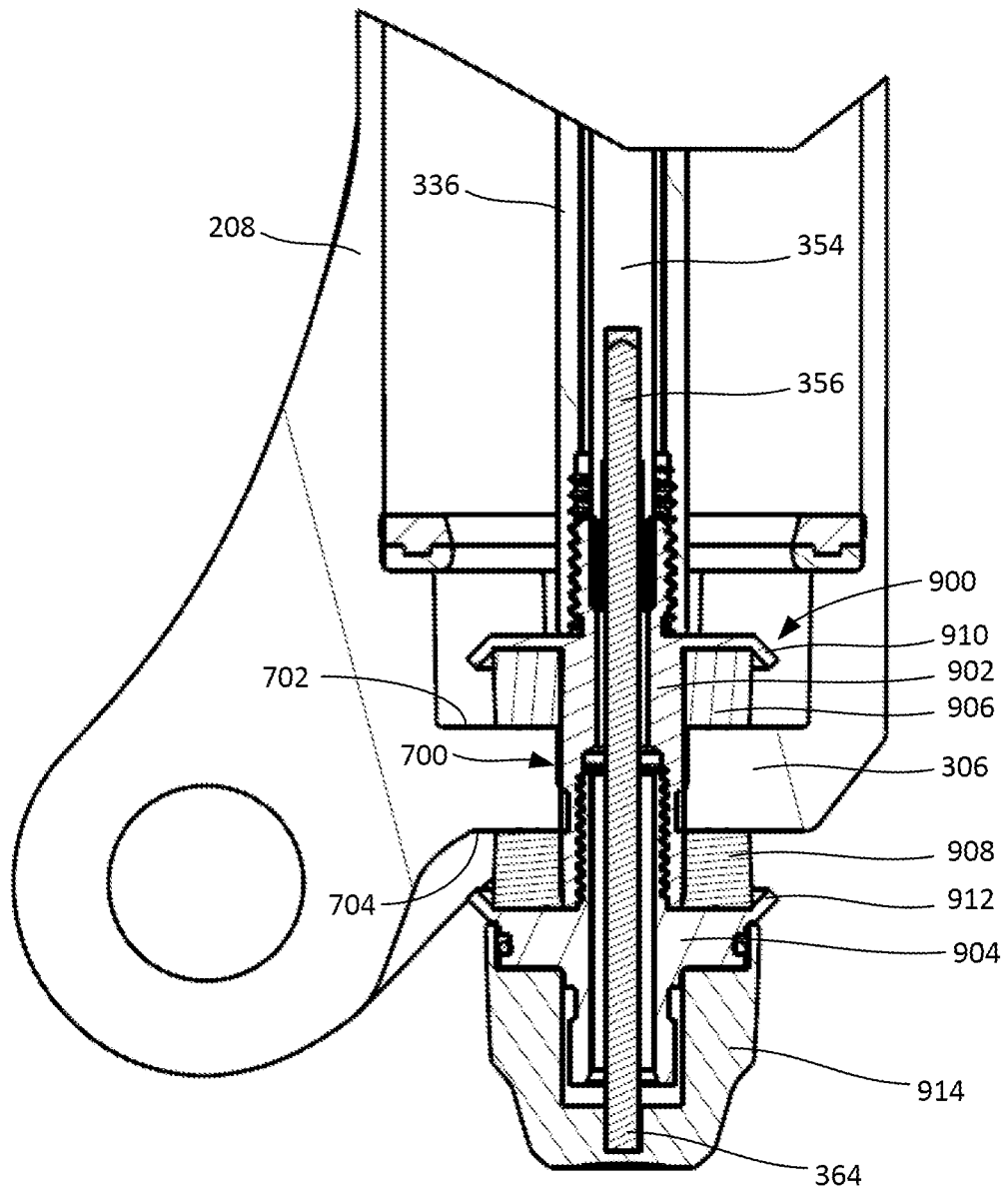
FIG. 9 is a cross-sectional view of another example isolator that can be implemented in the example front fork of the example bicycle of FIG. 1.

FIG. 9 is a cross-sectional view of another example isolator 900 that can be implemented in the front fork 108. The example isolator 900 is shown and described connection with the first lower tube 208 and the damper 320 (FIG. 3). The example isolator 900 can also be used in connection with the second lower tube 210 (FIG. 2) for the spring 318 (FIG. 3). Similar to the first isolator 370 disclosed above, the isolator 900 couples the shaft 336 to the bottom end 306 of the first lower tube 208 to absorb high frequency vibrations and improve shock absorption.

In the illustrated example, the isolator 900 includes a first translating bolt 902, a second translating bolt 904, a first elastomeric member 906, and a second elastomeric member 908. The first and second elastomeric members 906, 906 are substantially the same as the first and second elastomeric members 504, 510 disclosed above. Therefore, to avoid redundancy, a description of the shape and materials of the elastomeric members is not repeated. In the illustrated example, the first translating bolt 902 is disposed in the first lower tube 208. The first translating bolt 902 is threadably coupled to the shaft 336. The first translating bolt 902 extends through the opening 700 in the bottom end 306 of the first lower tube 208. The second translating bolt 904 is disposed outside of the first lower tube 208. The second translating bolt 904 is threadably coupled to the first translating bolt 902. Therefore, the first and second translating bolts 902, 904 are rigidly coupled to the shaft 336.

In the illustrated example, the first translating bolt 902 has a first flange 910. The first elastomeric member 906 is disposed (e.g., clamped) between the first flange 910 and the first side 702 of the bottom end 306. The second translating bolt 904 has a second flange 912. The second elastomeric member 908 is disposed between the second flange 912 and the second side 704 of the bottom end 306. The first and second elastomeric members 906, 908 compress and expand as forces are applied to the front fork 108. This enables the first lower tube 208 to move relative to the shaft 336 and, thus, relative to the first upper tube 204 (FIG. 2). Similar to the first and second elastomeric members 504, 510 disclosed above, the first and second elastomeric members 906, 908 can have ribs that expand to maintain contact with the first and second sides 702, 704 of the bottom end 306 as the first and second elastomeric members 906, 908 expand and/or are moved away from the respective first and second sides 702, 704.

In the illustrated example, the second rebound adjust rod 356 extends through the first and second translating bolts 902, 904 and is inserted into the first rebound adjust rod 354. A rebound adjustment knob 914 is coupled to the bottom end 364 of second rebound adjust rod 356. The rebound adjustment knob 914 is rotatable about the second translating bolt 904. A user (e.g., a rider) can rotate (e.g., twist) the rebound adjustment knob 914 to rotate the second rebound adjust rod 356. When the second rebound adjust rod 356 is rotated, the second rebound adjust rod 356 rotates the first rebound adjust rod 354, which causes the first rebound adjust rod 354 to move axially in the shaft 336, which opens or closes the adjustable orifice 352 (FIG. 3) and, thus, changes the rebound damping rate.

While the example isolators 370, 380, 900 are described in connection with a front fork suspension component, the example isolators 370, 380, 900 can be similarly implemented in connection with other types of suspension components for the front wheel 104 and/or for other components on a vehicle. For example, any of the example isolator 370, 380, 900 can be implemented in connection with a single-legged fork, which may include an integrated damper and spring system in the same leg. As another example, any of the example isolators 370, 380, 900 can be implemented in the rear shock absorber 136. As another example, any of the example isolators 370, 380, 900 can be implemented in connection with a suspension component used in connection with another component on the bicycle 100, such as the seat post 112.

From the foregoing, it will be appreciated that example apparatus have been disclosed that improve shock absorption in suspension components. The example isolators disclosed herein separate a shaft, such as a damper shaft or a spring shaft, from a tube of the suspension component and thereby enable relative movement between the tubes of the suspension component before the breakaway force is reached. The example isolators disclosed herein also absorb high frequency vibrations and, thus, reduce vibrations that are felt at the handlebars of the bicycle. This creates a more comfortable ride for the rider and improves rider confidence.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A suspension component for a bicycle, the suspension component comprising:

a first tube and a second tube configured in a telescopic arrangement and defining an interior space;

a damper in the interior space, the damper including:

a damper body defining a chamber;

a damper member in the chamber, the damper member dividing the chamber into a first chamber and a second chamber;

at least one fluid flow path across the damper member between the first chamber and the second chamber; and a shaft coupled to the damper member; and an isolator coupling the shaft to a bottom end of the second tube, the isolator including an elastomeric member to absorb vibrations.

2. The suspension component of claim 1, wherein the second tube includes a wheel attachment portion extending from the bottom end, the wheel attachment portion to be coupled to a hub on a wheel of the bicycle.

3. The suspension component of claim 1, wherein the elastomeric member is a first elastomeric member, the isolator further including a second elastomeric member.

4. The suspension component of claim 3, wherein the isolator includes a housing disposed in the second tube and coupled to the bottom end, the first and second elastomeric members disposed in the housing.

5. The suspension component of claim 4, wherein the isolator includes a translating bolt coupled to the shaft of the damper, the translating bolt having a plate disposed between the first and second elastomeric members.

6. The suspension component of claim 5, wherein the translating bolt has a post that extends through an opening in the housing, the post coupled to an end of the shaft of the damper.

7. The suspension component of claim 6, wherein the post of the translating bolt has a threaded section that is threadably coupled to the shaft.

8. The suspension component of claim 5, wherein the first elastomeric member has a first rib extending from a side of the first elastomeric member facing the plate, and wherein the second elastomeric member has a second rib extending from a side of the second elastomeric member facing the plate.

9. The suspension component of claim 5, wherein the first and second elastomeric members have the same hardness.

10. The suspension component of claim 5, wherein the damper includes a rebound adjust rod extending through the housing, the first and second elastomeric members, and the translating bolt, the rebound adjust rod rotatable to adjust a fluid flow rate across the damper member.

11. The suspension component of claim 10, wherein the isolator includes an anti-rotation device.

12. The suspension component of claim 11, wherein the anti-rotation device includes a pin coupled to the housing, the pin extending through an opening in the plate to prevent the translating bolt from rotating relative to the housing.

13. The suspension component of claim 1, further including a threaded fastener to couple the isolator to the bottom end of the second tube, the threaded fastener disposed outside of the second tube and inserted into an opening formed in the bottom end of the second tube.

\* \* \* \* \*